United States Patent
Li et al.

(10) Patent No.: US 10,880,411 B2
(45) Date of Patent: Dec. 29, 2020

(54) INTERDEVICE COMMUNICATIONS

(71) Applicant: INTEL CORPORATION, Santa Clara, CA (US)

(72) Inventors: Tianyou Li, Shanghai (CN); Shu Xu, Shanghai (CN); Lei Zhai, Shanghai (CN); Junyong Ding, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 89 days.

(21) Appl. No.: 16/095,611

(22) PCT Filed: May 23, 2016

(86) PCT No.: PCT/CN2016/082956
§ 371 (c)(1),
(2) Date: Oct. 22, 2018

(87) PCT Pub. No.: WO2017/201639
PCT Pub. Date: Nov. 30, 2017

(65) Prior Publication Data
US 2019/0132425 A1    May 2, 2019

(51) Int. Cl.
*H04L 29/06* (2006.01)
*H04L 29/08* (2006.01)
(Continued)

(52) U.S. Cl.
CPC ............. *H04L 69/08* (2013.01); *H04L 12/28* (2013.01); *H04L 63/08* (2013.01);
(Continued)

(58) Field of Classification Search
CPC . H04L 67/1061; H04L 69/08; H04L 67/2823; H04L 12/28; H04L 67/12;
(Continued)

(56) References Cited

U.S. PATENT DOCUMENTS 9,154,534 B1    10/2015 Gayles et al.
2012/0105629 A1*  5/2012 Colciago ............ H04L 12/2812
                                                        348/143
(Continued)

FOREIGN PATENT DOCUMENTS

CN    104506807 A    4/2015
CN    105187781 A    12/2015
CN    105591995 A    5/2016

OTHER PUBLICATIONS

Adolfsson et al "Application Programmers Guide" May 1, 2011; Retrieved from the Internet on Oct. 22, 2019; (https://www.onvif.org/wp-content/uploads/2016/12/ONVIF_WG-APG-Application_Programmers_Guide-1.pdf.); 201 Pages.
(Continued)

*Primary Examiner* — Abdullahi E Salad
(74) *Attorney, Agent, or Firm* — Schwegman Lundberg & Woessner, P.A.

(57) ABSTRACT

A method and apparatus for communicating between an open network video interface forum (ONVIF) device and an open interconnect consortium (OIC) device is provided. An example includes an ONVIF thrift server. The ONVIF thrift server includes an ONVIF communications subsystem, a network communication subsystem, an ONVIF registrar to discover an ONVIF device through the ONVIF communications subsystem, and a thrift server application programming interface (API) to communicate with an ONVIF/OIC server through the network communication subsystem.

25 Claims, 9 Drawing Sheets

(51) Int. Cl.
*H04W 4/80* (2018.01)
*H04L 12/28* (2006.01)

(52) U.S. Cl.
CPC ...... *H04L 67/1061* (2013.01); *H04L 67/1097* (2013.01); *H04L 67/2823* (2013.01); *H04W 4/80* (2018.02)

(58) Field of Classification Search
CPC ..... H04L 63/08; H04L 67/1097; H04L 67/16; H04W 4/80
See application file for complete search history.

(56) References Cited

U.S. PATENT DOCUMENTS

| | | | |
|---|---|---|---|
| 2013/0018939 A1 | 1/2013 | Chawla et al. | |
| 2013/0147961 A1* | 6/2013 | Gao | H04N 7/181 348/159 |
| 2013/0226993 A1* | 8/2013 | Dorey | G06F 16/583 709/203 |
| 2013/0307071 A1* | 11/2013 | Lee | H01L 29/7816 257/343 |
| 2014/0298368 A1* | 10/2014 | Raman | H04N 21/25816 725/25 |
| 2015/0006296 A1 | 1/2015 | Gupta et al. | |
| 2015/0082033 A1* | 3/2015 | Bruce | H04L 63/08 713/168 |
| 2015/0135248 A1* | 5/2015 | Idaka | H04N 21/239 725/115 |
| 2015/0227638 A1* | 8/2015 | Crucs | G06F 16/972 715/760 |
| 2016/0112629 A1* | 4/2016 | Lee | H04N 7/183 348/39 |
| 2016/0127633 A1* | 5/2016 | Juhlin | G01B 11/00 348/143 |
| 2016/0232764 A1* | 8/2016 | Galvin | H04N 21/4143 |

OTHER PUBLICATIONS

Supplementary European Search Report for Related EP application Serial No. EP 16902629.1 with a completion date of Oct. 11, 2019 and dated Oct. 21, 2019; 4 pages.
International Search Report and Written Opinion for Related PCT Application PCT/CN2016/082956 filed May 23, 2016 dated Mar. 8, 2017. 11 pages.

* cited by examiner

400

INTERDEVICE COMMUNICATIONS

CROSS REFERENCE TO RELATED APPLICATIONS

Pursuant to 35 U.S.C. § 371, this application is the United States National Stage Application of International Patent Application No. PCT/CN2016/082956, filed on May 23, 2016, the contents of which are incorporated by reference as if set forth in their entirety herein.

TECHNICAL FIELD

The present techniques relate generally to internet-of-things (IoT) devices. More specifically the present techniques relate to devices using the open interconnectivity (OIC) standard that can interact with devices that are compatible with the open network video interface forum (ONVIF).

BACKGROUND

It has been estimated that the Internet of Things (IoT) may bring Internet connectivity to 50 billion devices by 2020. For organizations, IoT devices may provide opportunities for monitoring and tracking other devices and items, including IoT devices and other devices. However, as the number of these devices increases, the manual configuration of the devices may become increasingly difficult. Automatic tools for discovery and interactive configuration of the IoT devices are being developed, such as the open interconnectivity (OIC) standards from the Open Connectivity Foundation™ (OCF).

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1A:
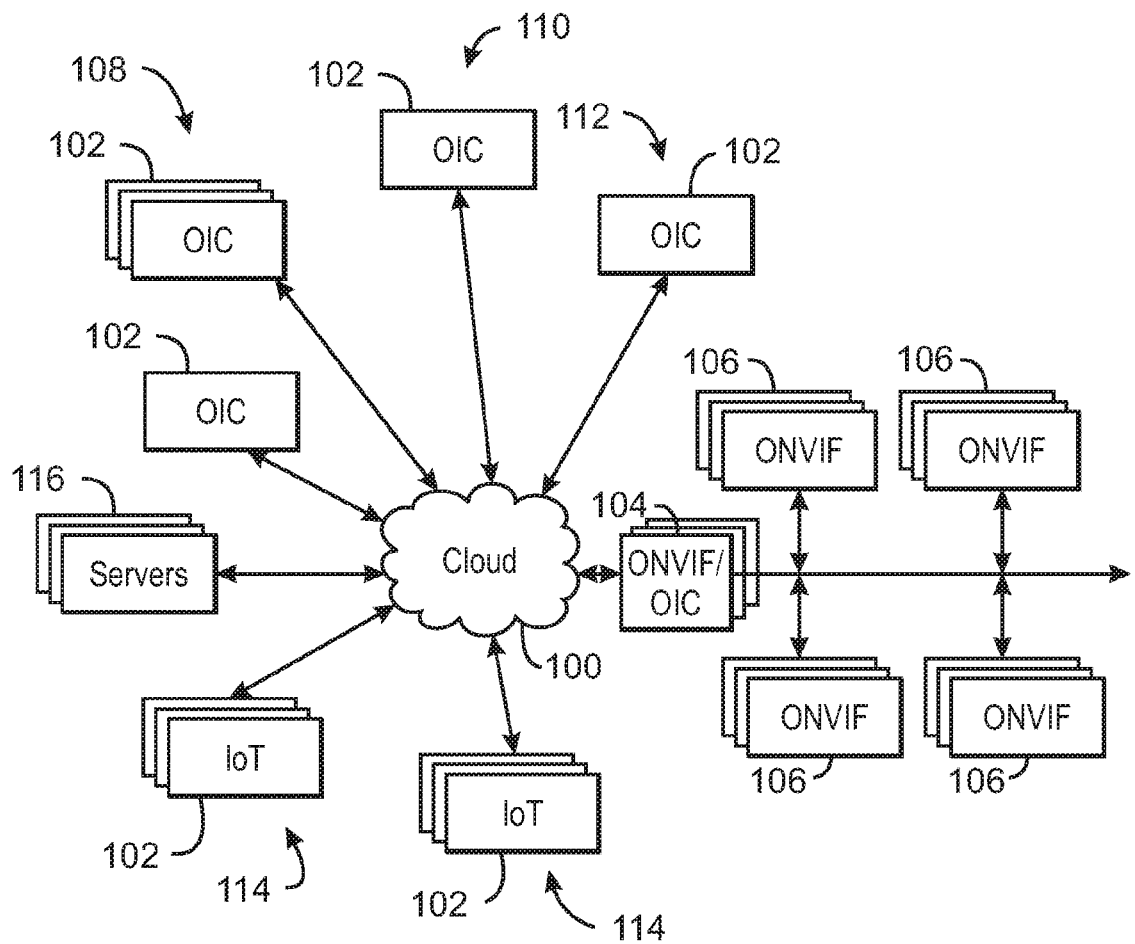
FIG. 1A is a drawing of a cloud computing network, or cloud 100, in communication with a number of OIC devices, at least some of which are ONVIF-OIC devices communicating with ONVIF devices.

The internet of things (IoT) is a concept in which a large number of computing devices are interconnected to each other and to the Internet to provide functionality and data acquisition at very low levels. For example, IoT networks may include commercial and home automation devices, such as water distribution systems, electric power distribution systems, pipeline control systems, plant control systems, light switches, thermostats, locks, cameras, alarms, motion sensors, and the like. These devices, termed IoT devices herein, may be accessible through remote computers, servers, and other systems, for example, to control systems or access data. Further IoT devices may include IoT gateways, used to couple other IoT devices to cloud applications.

Currently, efforts are focused on developing interoperability between IoT devices to allow IoT devices of different types and from different manufacturers to communicate and operate together. This has led to the development of IoT devices that use the open interconnect consortium (OIC) standard specification 1.0, released by the Open Connectivity Foundation™ (OCF) on Dec. 23, 2015, to formalize the management and control of the IoT devices. The OIC standard allows devices to discover each other and establish communications for interconnects.

However, a number of legacy standards exist for other devices and standards. For example, cameras and other security related IoT devices often use the ONVIF (open network video interface forum) standard. Many IP cameras conform to ONVIF standards and more than 5000 ONVIF conformant products are for sale in the market.

The techniques described herein allow ONVIF standard based devices to communicate with, and participate in, networks of OIC standard based devices without modification of the ONVIF standards. Further, devices that are already in use may be used without updates to product firmware or causing problems with existing software applications. Thus, IoT devices using applications built on top of an OIC standard application programming interface (OIC API) will be able to discover, control, and manage ONVIF devices without specific knowledge or linkage to the ONVIF standard.

Further, the techniques will allow for semantic mapping of communications between ONVIF devices and OIC devices. The mapping will include operations like discover, authentication, authorization, device configuration, capability description and notification subscription, as well as data transfer between the devices.

The techniques described herein are not limited to the ONVIF standard, but may be used to develop communications between OIC devices and devices using many other standards. These standards may include, for example, the AllJoyn standard promulgated by the AllSeen Alliance, or the OPC Classic or OPC UA standards, promulgated by the OPC® Foundation, among others. The semantic mapping would be based on the communications between devices in the standard described, thus devices described herein with respect to the ONVIF standard, may be modified to match communications with the target standard.

FIG. 1A is a drawing of a cloud computing network, or cloud 100, in communication with a number of OIC devices 102, at least some of which are ONVIF-OIC devices 104 communicating with ONVIF devices 106. The cloud 100 may represent the Internet, or may be a wide area network, such as a proprietary network for a company. The OIC devices 102 may include any number of different types of devices, grouped in various combinations. For example, the OIC devices 102 may include remote weather stations 108, integrated sensors 110, temperature sensors 112, local information terminals 114, and any number of other devices. The OIC devices 102 may be communicating through the cloud 100 with a server 116 that provides information to a user, for example, to provide an image, video, or other information from an ONVIF device 106.

The ONVIF-OIC device 104 may include a single device or multiple devices that allows OIC devices 102 to discover and communicate with ONVIF devices 106. As described herein, the ONVIF-OIC device 104 may include a first server to communicate with the ONVIF devices 106, and a second server to communication between the first server and the OIC devices 102. As shown in FIG. 1A, the two servers may be deployed in a single unit. In some examples, further flexibility can be obtained by dividing the two devices into separate units, as described with respect to FIG. 1B.

Figure 1B:
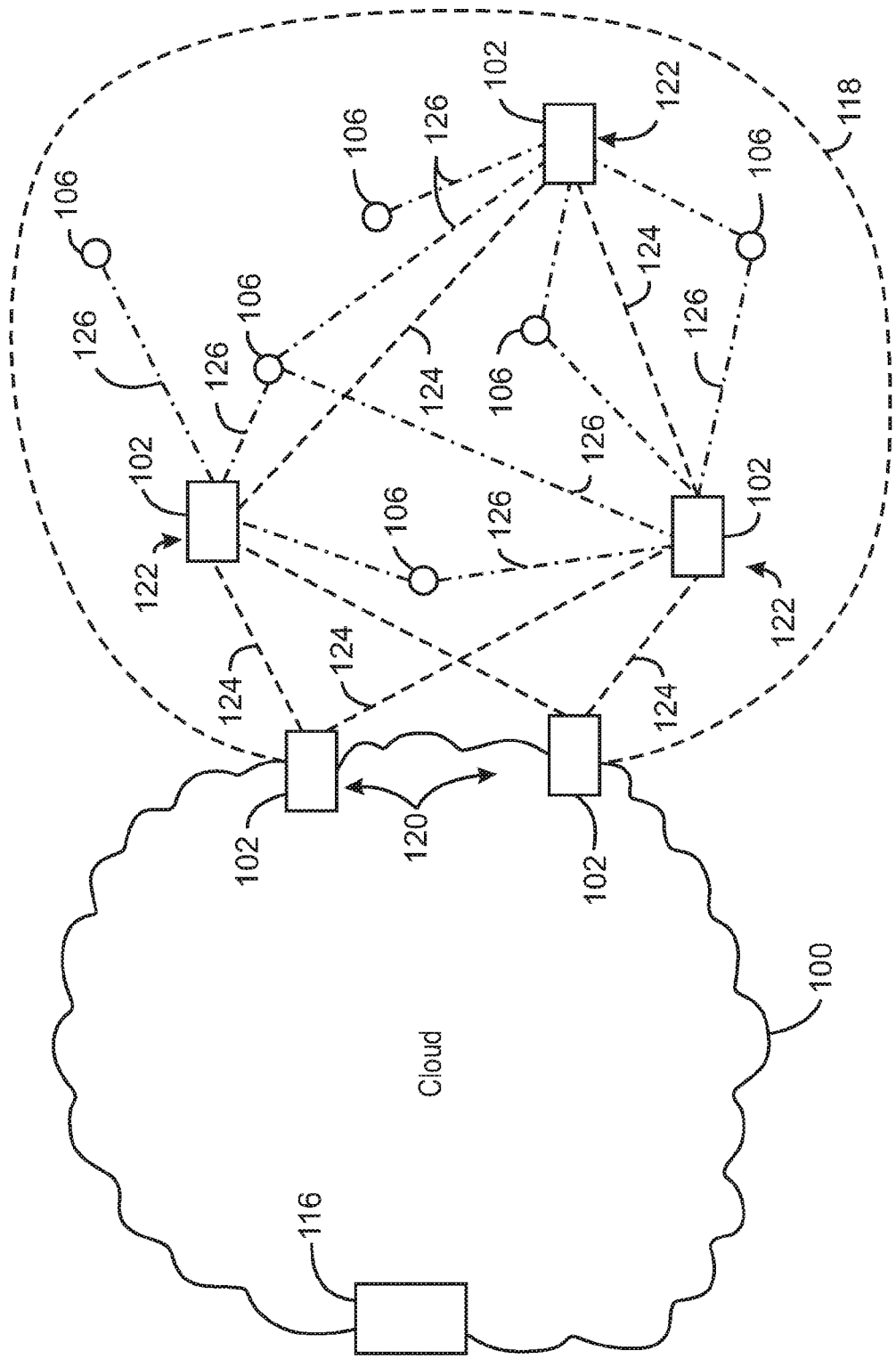
FIG. 1B is a drawing of a cloud computing network, or cloud, in communication with a mesh network of OIC devices and ONVIF devices, which may be termed a fog operating at the edge of the cloud.

FIG. 1B is a drawing of a cloud computing network, or cloud 100, in communication with a mesh network of OIC devices 102 and ONVIF devices 106, which may be termed a fog 118 operating at the edge of the cloud 100. The fog 118 may be considered to be a massively interconnected network wherein a number of OIC devices 102 are in communication with each other, and with other devices, such as the ONVIF devices 106.

Two types of OIC devices 102 are shown in this example, ONVIF/OIC servers 120 and ONVIF thrift servers 122. Other types of OIC devices 102 may be used in this network, such as thermostats or temperature sensors, among many others. Further, any combinations of OIC devices 102 and functionality may be used. For example, the ONVIF/OIC servers 120 may also function as edge devices, or gateways, that provide communications between the cloud 100 and the fog 118, as well as providing communications with the ONVIF thrift servers 122.

OIC standard communication links (OIC links) 124 between the OIC devices 102 such as the ONVIF/OIC servers 120 and ONVIF thrift servers 122 may be provided using any number of connections, such as through a WiFi network, a Bluetooth network, or an Ethernet connection. Similar connections may provide ONVIF standard communication links (ONVIF links) 126 between the ONVIF thrift servers 122 and the ONVIF devices 106.

Communications from any OIC device 102 may be passed along the most convenient OIC links 124 between any of the OIC devices 102 to reach the ONVIF/OIC servers 120, which are also functioning as gateways to the cloud 100 in this example. In these networks, the number of interconnections provide substantial redundancy, allowing communications to be maintained, even with the loss of a number of OIC devices 102.

The fog 118 of these OIC devices 102 devices may be presented to devices in the cloud 100, such as a server 104, as a single device located at the edge of the cloud 100, e.g., a fog 118 device. In this example, alerts and information coming from the fog 118 device may be sent without being identified as coming from a specific OIC device 102 within the fog 118. This may be implemented in accordance with standard under development by the Open Fog Consortium, among others.

In some examples, the OIC devices 102 may be configured using an imperative programming style, e.g., with each OIC device 102 having a specific function. However, the OIC devices 102 forming the fog 118 device may be configured in a declarative programming style, allowing the OIC devices 102 to reconfigure their operations and determine needed resources in response to conditions, queries, and device failures. For example, a request may be made from the cloud server 116 to the fog 118 to provide a video feed of a certain location. The OIC devices 102 may determine which ONVIF devices 106 are located proximate to the requested location, and instruct an ONVIF device 106 to provide the video. This may take place without identifying a specific camera to take the video feed. A failure of an OIC device 102, such as an ONVIF/OIC server 120 or an ONVIF thrift server 122 will not stop the feed, as a redundant server 120 or 122 may provide the data stream. If an ONVIF device 106 has failed, the fog 118 of OIC devices 102 may identify alternate ONVIF devices 106 that have overlapping coverage, if available, and provide that feed.

Figure 2:
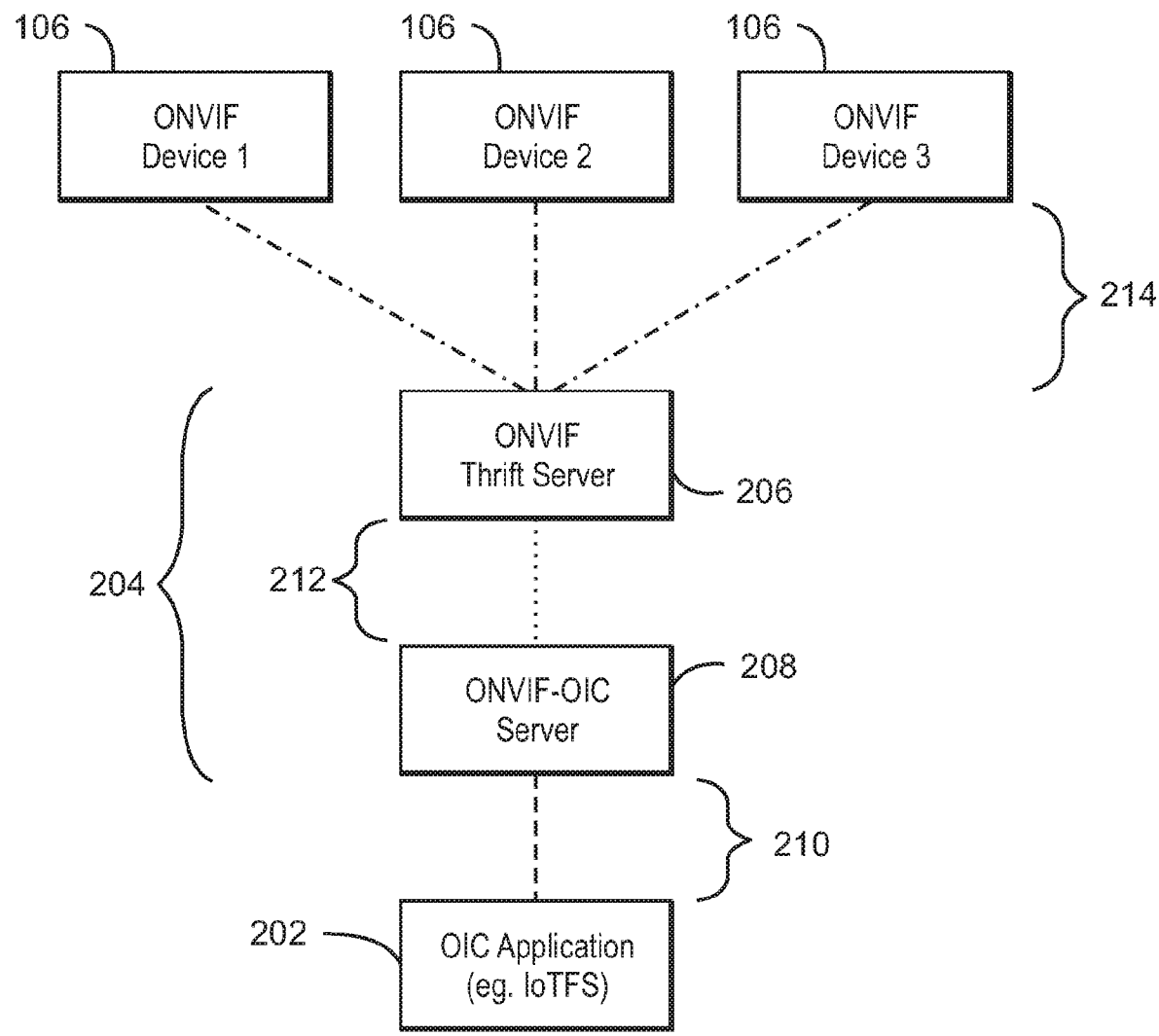
FIG. 2 is a block diagram of an OIC application in communication with a number of ONVIF devices through an ONVIF/OIC virtual device.

FIG. 2 is a block diagram of an OIC application 202 in communication with a number of ONVIF devices 106 through an ONVIF/OIC virtual device 204. The ONVIF/OIC virtual device 204 may have two separate components, the ONVIF thrift server 206 and the ONVIF/OIC server 208. As described above, the two components may be deployed together in same process, they may be deployed separately as two different processes in same box, or they may be deployed in separate boxes in communication through a network. This provides flexible deployment models, with the capability of M:N (many to many) mapping between ONVIF thrift servers 206 and ONVIF/OIC servers 208, provide various combinations of deployments that will fit the sophistic customer environment and user scenarios.

The OIC application 202 may communicate with the ONVIF/OIC server 208 through OIC compatible links 210, for example, using the OIC API. The ONVIF/OIC server 208 communicates with the ONVIF thrift server 206 through communications links 212 hosting a proprietary protocol, using an interface termed a thrift API herein. The ONVIF thrift server 206 communicates with the ONVIF devices 106 through communications links 214 that use an ONVIF compatible protocol.

The ONVIF thrift server 206 performs a number of functions. It performs a discovery for ONVIF devices 106, for example, using WS-Discovery. The ONVIF thrift server 206 may also perform registration of ONVIF devices 106 either automatically or manually. The ONVIF thrift server 206 may retrieve properties of the ONVIF devices 106, register the notification handler for the ONVIF devices 106, and pass the notification event to ONVIF/OIC server 208. The ONVIF thrift server 206 may also control the ONVIF devices 106 according to the control commands passed from ONVIF/OIC server 208.

Further, the ONVIF thrift server 206 may configure the ONVIF devices 106, including, for example, initializing the configuration for an ONVIF device 106, configuring the ONVIF device 106 according to the configuration command passed from ONVIF/OIC server 208, and setting any persistent configuration parameters. The ONVIF thrift server 206 will also provide the API to the ONVIF/OIC server 208 and authentication with the ONVIF devices 106 and provide authorization, for example, by using a delegation model.

The ONVIF/OIC server 208 retrieves the device information for the ONVIF devices 106 from the ONVIF thrift server 206 and dynamically creates OIC resources according to the device information. The ONVIF/OIC server 208 accepts the OIC client request and converts the OIC request into internal command before passing the command to the ONVIF thrift server 206. Further, the ONVIF/OIC server 208 will handle notification and registration of an OIC application 202, and handle OIC security including OIC style authentication. The ONVIF/OIC server 208 will delegate authorization requests to the ONVIF thrift server 206.

While the configuration shown in FIG. 2 is one example of communications, the examples described are not limited to this fixed configuration. The use of composable devices, e.g., individual OIC devices 102 that can self-select participation to form virtual devices, may allow the ONVIF system to be larger, more transparent, and more redundant than fixed configurations.

For example, returning to FIG. 1B, the fog 118 may allow the OIC devices 102 described herein to reconfigure or compose themselves into different groups or virtual devices to provide information from ONVIF devices 106 across a massive network of interconnected devices. If an ONVIF thrift server 122 providing access to other OIC devices 102 to a particular ONVIF device 106 fails, other ONVIF thrift servers 106 may take over and provide access to that ONVIF device 106, performing a fail-over service. Further, as noted above, if an ONVIF device 106 fails, the fog 118 of OIC devices 102 may determine if the information can be provided from another ONVIF device 106, for example, having overlapping coverage.

The composability of the OIC devices 102 to provide the information as needed may provide redundancy in communications as well as transparency to users. In this type of composable system, a user does not have to know any details of the communications infrastructure for the fog 118. When a user needs information concerning an ONVIF device 106, the user requests the information based on the location, and is provided with information from the nearest ONVIF devices 106.

As described herein, the ONVIF/OIC servers 120 may function as gateways also, but the examples are not limited to this. In some examples, separate gateways may be provided, such as OIC devices 102 that transfer network communications in the fog 118 to network communications in the cloud 100.

Figure 3:
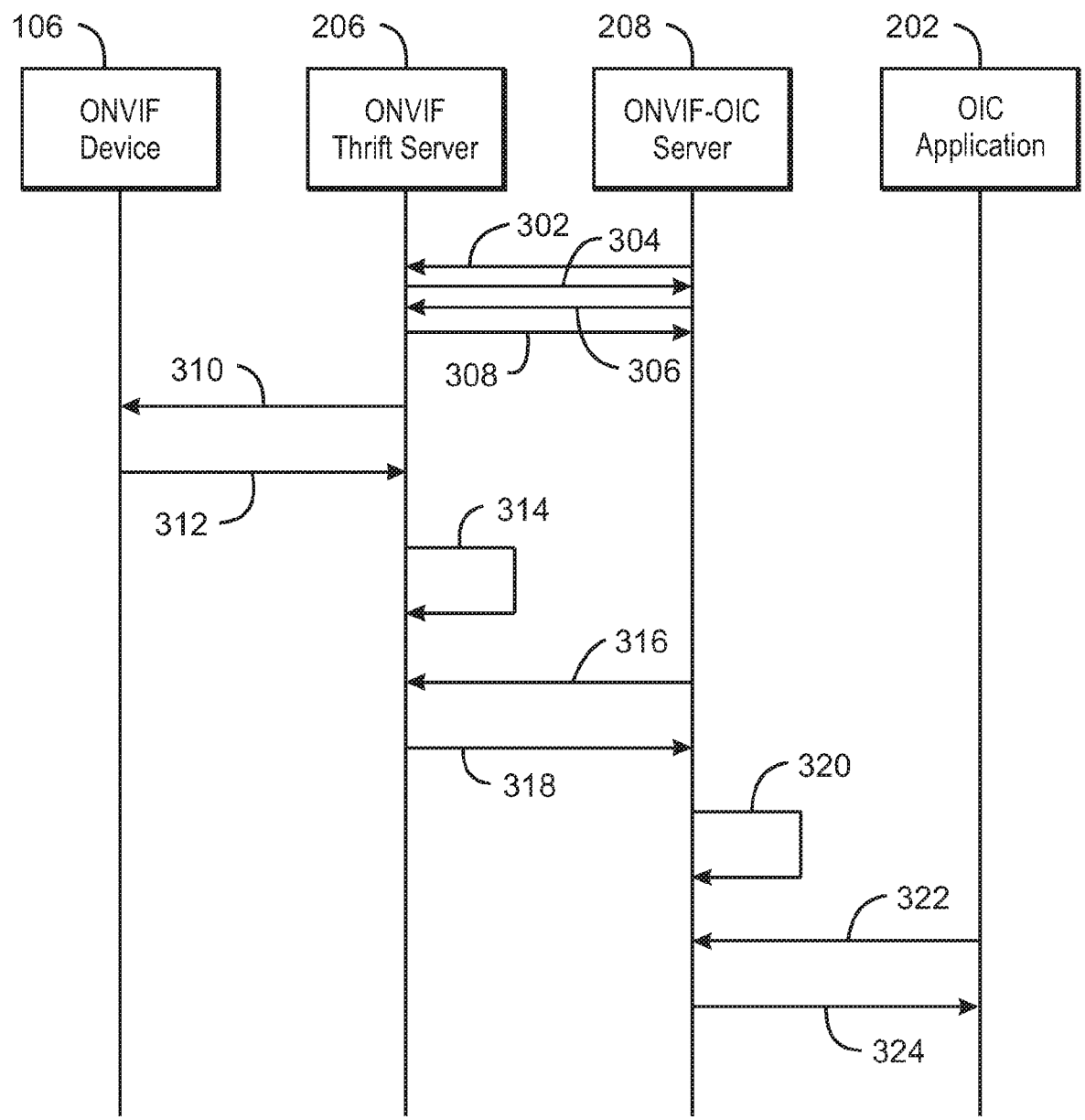
FIG. 3 is a ladder diagram showing communications that may take place between an OIC application and an ONVIF device through an ONVIF/OIC server and an ONVIF thrift server.

FIG. 3 is a ladder diagram showing communications that may take place between an OIC application 202 and an ONVIF device 106 through an ONVIF/OIC server 208 and an ONVIF thrift server 206. Like numbered items are as described with respect to FIGS. 1A, 1B, and 2.

To begin, the ONVIF/OIC server 208 can connect with an ONVIF thrift server 206, for example, by sending a discovery request 302. If an ONVIF thrift server 206 sends a response 304 to the discovery request, the connection is completed. Once connected, the ONVIF/OIC server 208 will send a query 306 to the ONVIF thrift server 206 about the ONVIF devices 106 it has registered. The ONVIF thrift server 206 may respond with a list of devices 308, or, in response to a subsequent request from the ONVIF/OIC server 208, a list of changes from previous requests.

The ONVIF thrift server 206 will try to discover ONVIF devices 106, for example, by sending a discovery request 310 that is compliant with the WS-Discovery API of the ONVIF protocol. ONVIF devices 106 will send a response 312 to the ONVIF discovery request to identify the ONVIF device 106. The ONVIF thrift server 206 may then build 314 a map of ONVIF devices 106. The map may be used to determine changes, for example, if ONVIF devices 106 are disconnected.

The ONVIF/OIC server 208 may periodically send a query 316 for the change information from the ONVIF thrift server 206. In response to the query, the ONVIF thrift server 206 provides the information 318 to the ONVIF/OIC server 208. The ONVIF/OIC server 208 may then build 320 OIC resources corresponding to the changes in the ONVIF devices 106 as provided by from ONVIF thrift server 206.

An OIC application 202, may send a discovery request 322 to look for other OIC devices 102. For example, the ONVIF/OIC server 208 can be discovered by using an/oic/d command. In response to the discovery request, the ONVIF/OIC server 208 will send a response 324 to the OIC client request with current OIC resource information. Each OIC device 102 may be discovered using /oic/res. Each ONVIF device 106 is logically an OIC resource which created by the ONVIF/OIC server 208. The ONVIF/OIC server 208 will query 316 the ONVIF thrift server 206, and according to the changes in the information, will create or delete the OIC resources. The OIC application 202 can discover both the OIC device 102, e.g., the ONVIF/OIC server 208, and specific resources, such as the ONVIF resources hosted by the ONVIF/OIC server 208.

Once the ONVIF/OIC server 208 boots up and initializes, it will broadcast itself via an OIC presence protocol. Each time the ONVIF/OIC server 208 creates or deletes a resource, based on information from the ONVIF thrift server 206, it will broadcast the resource presence via an OIC protocol.

Normal ONVIF properties are defined as a name/value pair, which is supported by the OIC protocol as well. The value may be set to be read only unless it is configurable property defined by ONVIF standard. The control of the ONVIF device 106 may be performed by updating the value of the property of a particular resource. The property name may be provided in the ONVIF standard, for example, "PTZ" for control of the pan-tilt-zoom controls for a camera. If an ONVIF device 106 has a PTZ capability, as reported by the ONVIF thrift server 206, the ONVIF/OIC server 208 will create resources with a corresponding property, for example, named a pan/value, a tilt/value, and a zoom/value. The values for the PTZ resources would be updatable, for example, with values indicating each of the pan, tilt, and zoom. The changed values would then be provided to the ONVIF thrift server 206 to be passed on to the camera.

Both the ONVIF standard and the OIC standard support a notification mechanism. The notification handler registered in the ONVIF/OIC server 208 will in turn request the ONVIF thrift server 206 to register a synchronization to an ONVIF device 106. The notification event generated from ONVIF device 106 may pass to the ONVIF thrift server 206, and may then be transferred to the ONVIF/OIC server 208. The ONVIF/OIC server 208 will manipulate the notification to make it OIC compatible and then pass it to the OIC application 202.

Each ONVIF device 106 may be uniquely identified in the network. The ONVIF thrift server 206 can be used to maintain the ONVIF device identification and corresponding OIC compatible name for that ONVIF device 106.

Figure 4:
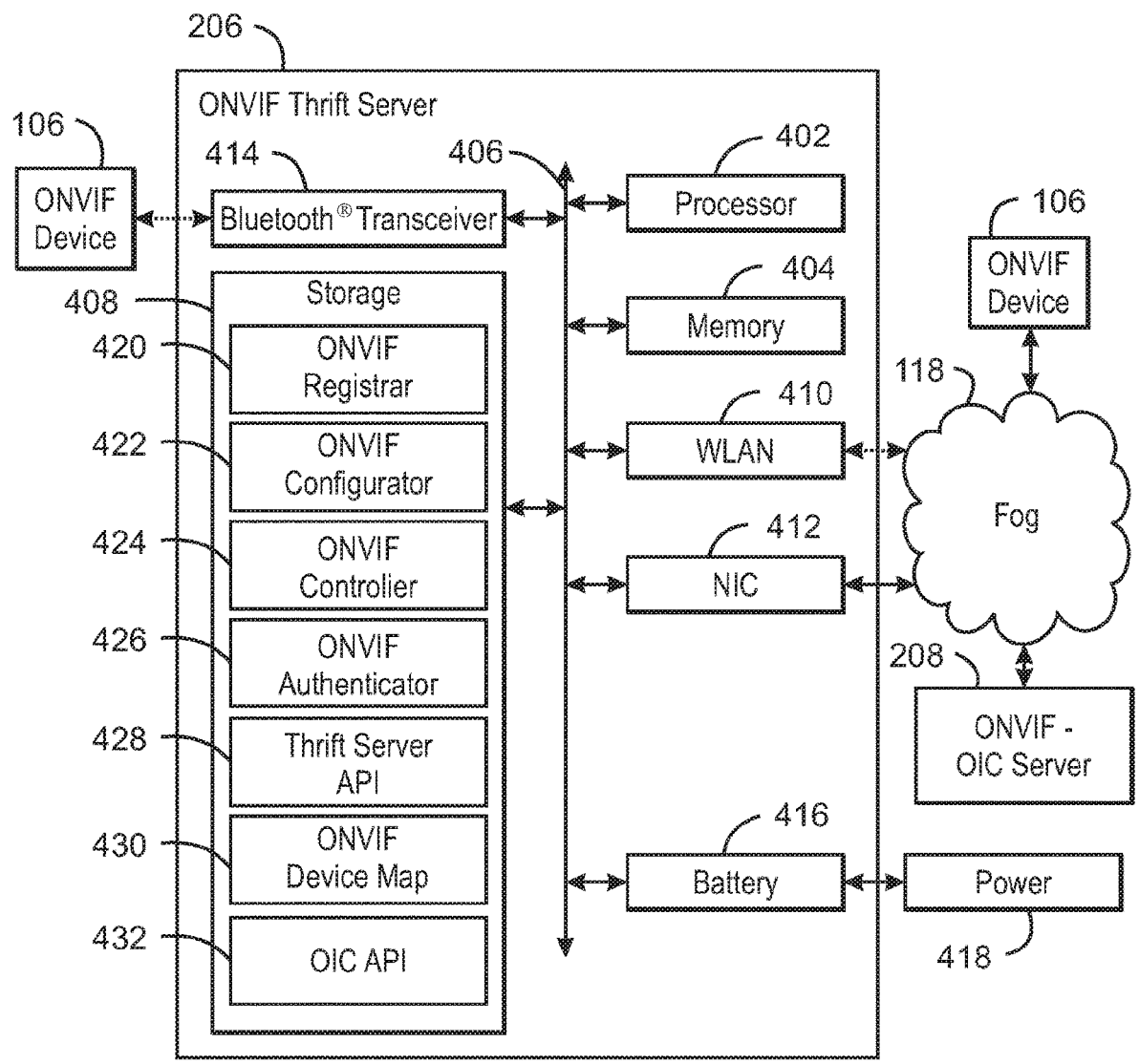
FIG. 4 is a block diagram of components that may be present in an example of an ONVIF thrift server.

FIG. 4 is a block diagram of components that may be present in an example of an ONVIF thrift server 206. Like numbered items are as described with respect to FIGS. 1 and 2. The ONVIF thrift server 206 may include any combinations of the components shown in the example 400. The components may be implemented as ICs, portions thereof, discrete electronic devices, or other modules, logic, hardware, software, firmware, or a combination thereof adapted in the ONVIF thrift server 206, or as components otherwise incorporated within a chassis of a larger system. The block diagram of FIG. 4 is intended to show a high level view of components of the ONVIF thrift server 206. However, some of the components shown may be omitted, additional components may be present, and different arrangement of the components shown may occur in other implementations.

The ONVIF thrift server 206 may include a processor 402, which may be a microprocessor, a multi-core processor, a multithreaded processor, an ultra-low voltage processor, an embedded processor, or other known processing element. The processor 402 may be a part of a system on a chip (SoC) in which the processor 402 and other components are formed into a single integrated circuit, or a single package, such as the Edison™ or Galileo™ SoC boards from Intel. As an example, the processor 402 may include an Intel® Architecture Core™ based processor, such as a Quark™, an Atom™, an i3, an i5, an i7, or an MCU-class processor, or another such processor available from Intel® Corporation, Santa Clara, Calif. However, other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5/A6 processor from Apple® Inc., a Snapdragon™ processor from Qualcomm® Technologies, Inc., or an OMAP™ processor from Texas Instruments, Inc.

The processor 402 may communicate with a system memory 404 over a bus 406. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDlMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

The bus 406 may include any number of technologies, including industry standard architecture (ISA), extended ISA (EISA), peripheral component interconnect (PCI), peripheral component interconnect extended (PCIx), PCI express (PCIe), or any number of other technologies. The bus 406 may be a proprietary bus, for example, used in a SoC based system. Other bus systems may be included, such as an I²C interface, an SPI interface, and point to point interfaces, among others.

To provide for persistent storage of information such as data, applications, operating systems and so forth, a mass storage 408 may also couple to the processor 402 via the bus 406. To enable a thinner and lighter system design the mass storage 408 may be implemented via a solid state disk drive (SSDD). However, the mass storage 408 may be implemented using a micro hard disk drive (HDD) in some examples of the ONVIF thrift server 206. Further, any number of new technologies may be used for the mass storage 408 in addition to, or instead of, the technologies described, such resistance change memories, phase change memories, holographic memories, or chemical memories, among others. For example, the ONVIF thrift server 206 may incorporate the 3D XPOINT memories from Intel® and Micron®.

The bus 406 may couple the processor 402 to a WLAN transceiver 410, for example, for communications with the devices in the fog 118. This may include, for example, the ONVIF devices 106 and the ONVIF/OIC server 208. The communications through the WLAN transceiver 410 may use the Wi-Fi™ communications protocol in accordance with the Institute of Electrical and Electronics Engineers (IEEE) 802.11 standard.

Further, communications with devices in the fog 118 is not limited to WLAN, as the communications may use any number of other network links, including an Ethernet link implemented by a network interface controller (NIC) 412. Any number of other radio transceivers, configured for a particular wireless communication protocol, may be used as the network connections. For example, wireless wide area communications, e.g., according to a cellular or other wireless wide area protocol, can occur via a WWAN unit. The ONVIF thrift server 206 is not limited to these types of radio transceivers, but may include any number of other radio communications equipment, such as a transceiver 414 compatible with the Bluetooth® standard as defined by the Bluetooth® special interest group. For example, the ONVIF thrift server 206 may communicate over a wireless personal area network (WPAN) according to the IEEE 802.15.4 standard, among others. The ONVIF communications subsystem may use any of these technologies to communicate with the ONVIF devices 106, or may use the fog 118 network to communicate with the ONVIF devices 106.

The ONVIF thrift server 206 may include a battery 416 to provide power during a loss of power 418. The battery 416 may have a monitoring system coupled to the bus 406 to alert a user if the battery 416 is failing. The power 418 may be a connection to a power grid or another type of power source, such as a solar panel, wind turbine, or other power source.

The mass storage 408 may include a number of modules to implement the communications functions described herein. These modules may include an ONVIF registrar 420 to discover and register ONVIF devices 106. An ONVIF configurator 422 may send commands to the ONVIF device 106 to configure the device. An ONVIF controller 424 may take commands received from the ONVIF/OIC server 208, convert them to ONVIF format, and send them to an ONVIF device 106. An ONVIF authenticator 426 may handle security for the ONVIF devices 106, for example, authenticating the ONVIF thrift server to an ONVIF device 106. A thrift server API 428 may handle communications from the ONVIF/OIC server 208.

An ONVIF device map 430 may include a listing of all ONVIF devices 106 registered to the ONVIF thrift server 206. In some examples, the ONVIF device map 430 may also include a map of ONVIF devices 106 registered to other ONVIF thrift servers 206 to permit a failover to take place if an ONVIF thrift server 206 servicing an ONVIF device 106 stops working. To aid in communications and failover, the ONVIF thrift server 206 may include an OIC API 432 that facilitates communications between OIC devices 102, such as the ONVIF thrift server 206.

Figure 5:
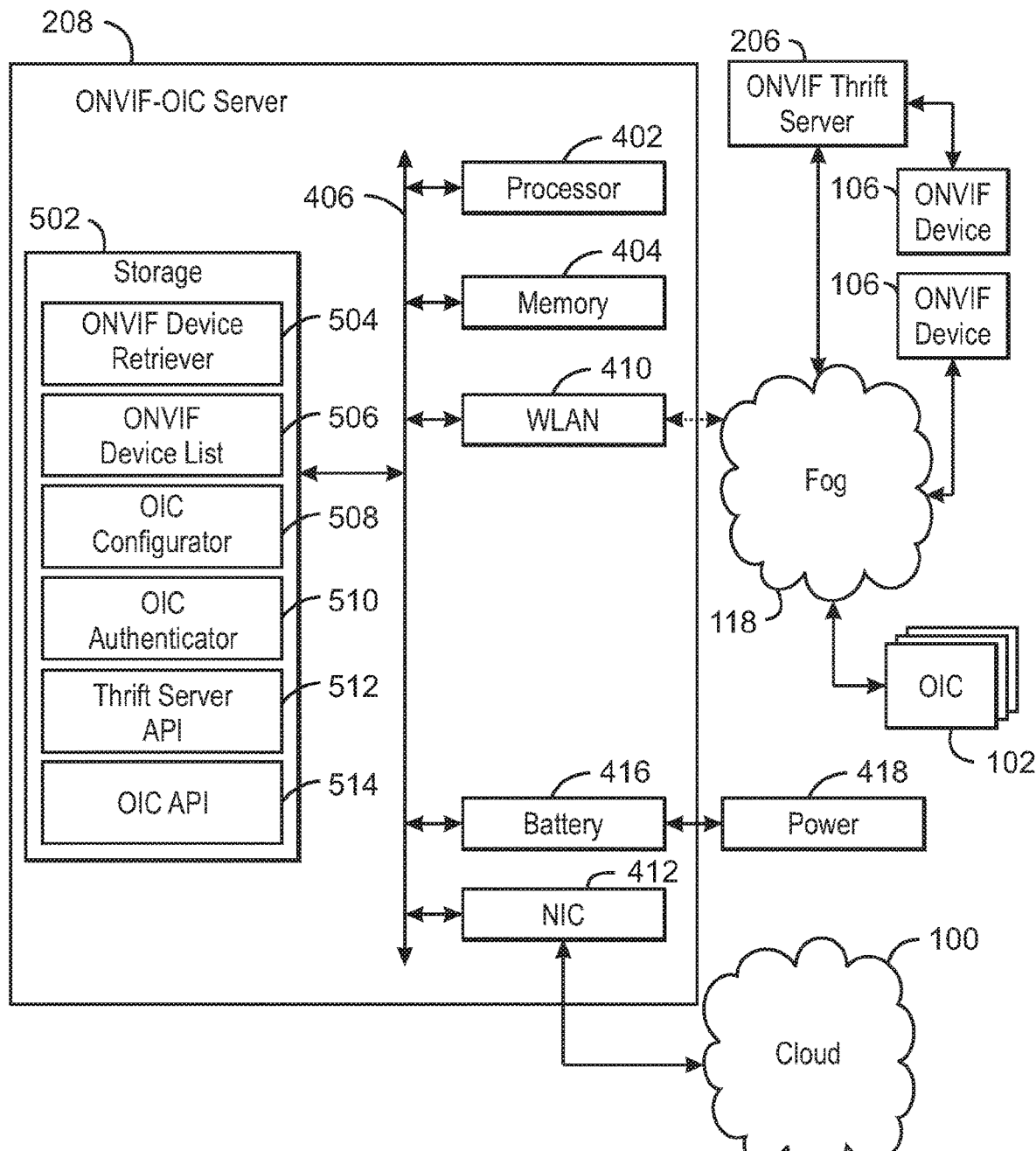
FIG. 5 is a block diagram of an example of components that may be present in an ONVIF/OIC server.

FIG. 5 is a block diagram of an example 500 of components that may be present in an ONVIF/OIC server 208. Like numbered items are as described with respect to FIGS. 1, 2, and 4. The components may be implemented as ICs, portions thereof, discrete electronic devices, or other modules, logic, hardware, software, firmware, or a combination thereof adapted in the ONVIF/OIC server 208, or as components otherwise incorporated within a chassis of a larger system. The block diagram of FIG. 5 is intended to show a high level view of components of the ONVIF thrift server 206. However, some of the components shown may be omitted, additional components may be present, and different arrangement of the components shown may occur in other implementations.

The components present in the ONVIF/OIC server 208 may be similar to the components present in the ONVIF thrift server 206. It may be understood, however, that any individual unit may have any combinations or arrangements of the components discussed. For example, the NIC 412 may be used to provide gateway services to the cloud 100 from the fog 118 of devices.

The ONVIF/OIC server 208 may include a storage device 502. The storage device may be as described for the storage device 408 used for the ONVIF thrift server 206. The storage device 502 may include a number of modules to coordinate the communications between OIC devices 102 and the ONVIF thrift server 206. The modules may include an ONVIF device retriever 504 to access the ONVIF thrift server 206 to pull listings of ONVIF devices 106 and changes. The information may be used to create an ONVIF device list 506, listing ONVIF devices 106 that may be accessed as OIC resources. An OIC configurator 508 may configure the ONVIF device 106 representations. An OIC authenticator 510 may provide security services, for example, authenticating the OIC devices 102 for access to the ONVIF devices 106. A thrift server API 512 may provide an interface for communications with the ONVIF thrift server 206. On OIC API 514 may provide an interface for communications with other OIC devices 102, for example, to accept commands for ONVIF devices 106 or to provide data from ONVIF devices 106.

The modules may include any number of other modules that are not shown, such as modules for booting, message generation, formatting of video feeds, and the like. Further, not all of the modules shown in FIGS. 4 and 5 need be present in every example. The OIC API 432 of the ONVIF thrift server 206, as discussed with respect to FIG. 4, may not be present, in which case, the ONVIF thrift server 206 communications exclusively with the ONVIF/OIC server 208 through the thrift server APIs 428 and 512. In some examples, all of the modules described with respect to FIGS. 4 and 5 may be deployed on a single ONVIF-OIC device 104, for example, as described with respect to FIG. 1A. In these examples, the modules may be combined to perform the functions described herein.

Figure 6:
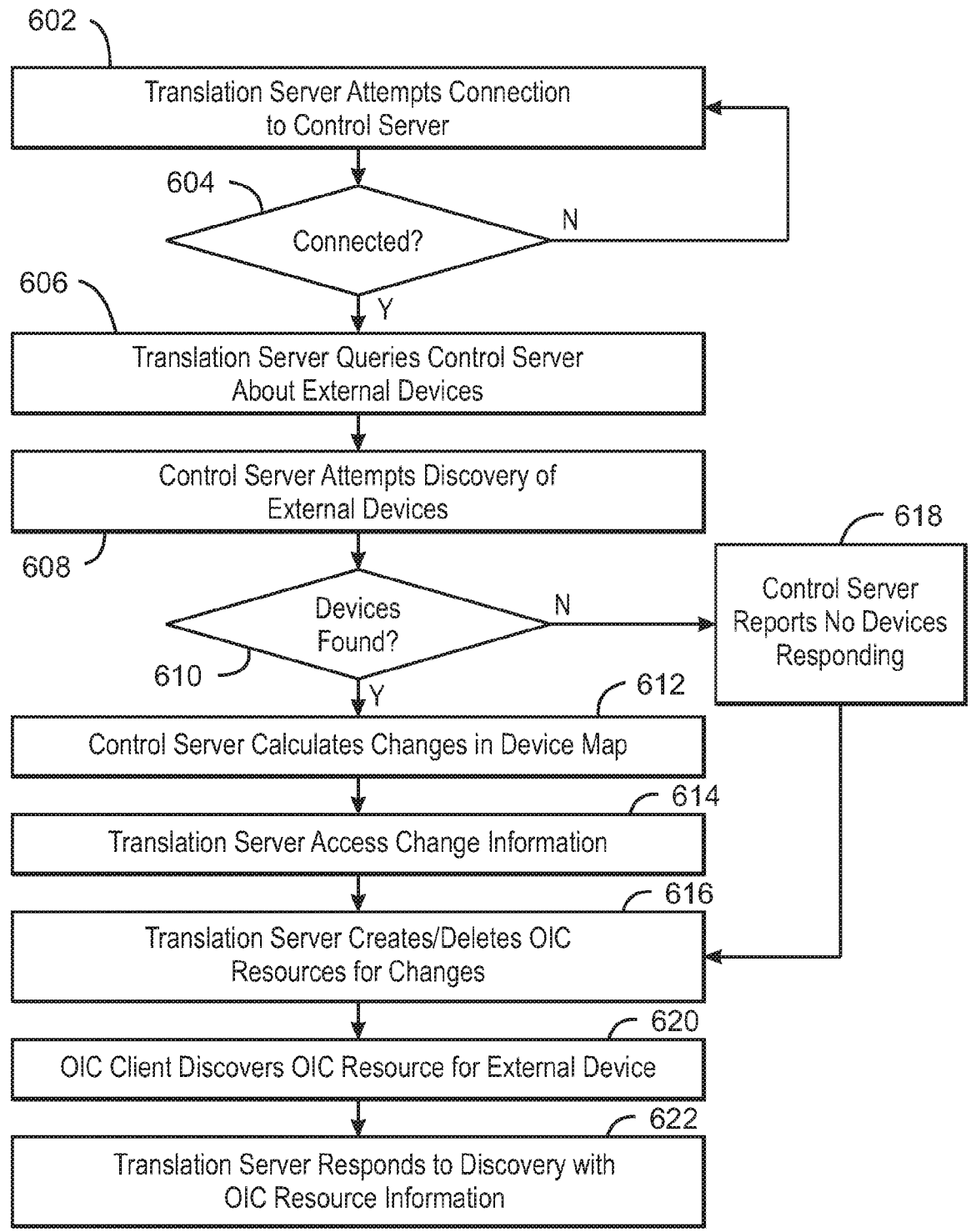
FIG. 6 is a process flow diagram of an example of a method for communicating between an external device and an OIC device.

FIG. 6 is a process flow diagram of an example of a method 600 for communicating between an OIC device and an external device using a different standard, such as an ONVIF device. The method begins at block 602 when a translation server, such as an ONVIF/OIC server, attempts to connect to a control server, such as an ONVIF thrift server. If the connection attempt fails, as determined at block 604, process flow returns to block 602 to attempt it again. The actions taken at block 602 and 604 may not be performed, for example, if the translation server and control server are combined in a single unit.

At block 606, the translation server queries the control server about the presence of external devices. As described with respect to FIG. 3, the query may be used to obtain a listing of external devices registered with the control server, or may be a query to obtain changes from the last query. In some examples, the control server may send a notification of a change directly to the translation server, for example, if an external device in current use stops functioning.

At block 608, the control server attempts discovery of external devices. This may be performed by sending out a discovery request consistent with the external standard, for example, the ONVIF standard as described with respect to FIG. 3. In some examples, a manual registration of external devices is performed, for example, by triggering an external device to send out a presence notification, Bluetooth® pairing request, or other signal to alert the control server of its presence.

If, at block 610, devices are found, at block 612, the control server calculates changes in the device map. This may include adding devices to the list, removing devices from the map, or recording devices that are already registered to other control servers. At block 614, the translation server accesses the change information. In this example, the translation server is already in communications with the control server, so the most efficient use of resources is to query only for the changes that have occurred since the last query.

If, at block 610, no external devices are found, process flow proceeds to block 618. At block 618, the control server reports to the translation server that no external devices are present. Process flow then proceeds to block 616.

At block 616, the translation server creates or deletes OIC resources to correspond to the changes from the control server. For example, if a new external device is present, the translation server creates an OIC resource for the external device. Further, if the control server has reported no external devices were found, the translation server may remove all external devices from the resource list.

At block 620, an OIC client, such as an OIC application, discovers the OIC resource for the external device. This may be performed by a notification of the presence of the OIC resource from the translation server, or it may be as a result of a periodic query for new resources. At block 622, the translation server may respond to the discovery of the OIC resource with the OIC resource information.

The OIC resource information may include a name-value pair for each of the parameters passing from the external device to the translation server. As described herein, commands may be sent from the OIC application to the external device by setting values for OIC resources, while data may be monitored as values in the OIC resources. As an example, actions that may be supported for ONVIF devices are shown in Table 1. Devices using other communications standards may have other types of supported actions in addition to or instead of those shown in Table 1.

TABLE 1

Example of ONVIF to OIC converter supported actions:

| OIC Required Property or Operation | ONVIF Corresponding Concept | OIC Name | Value |
|---|---|---|---|
| Resource Type | NO | | "oic.onvif.device" for ONVIF/OIC server; "oic.onvif.resource" for mapped ONVIF devices |
| Title | | | |
| Resource Type ID | NO | rt | |
| Resource Interface | NO | if | "oic.if.rw" |
| Resource URI | GetDeviceInformaion | /oic/onvif/ {manufacturer}/ {model}/ {serialnumber}/ {hardwareid} | |
| property | ContinuousMove/Stop | pan | [−1, 1] |
| property | ContinuousMove/Stop | tilt | [−1, 1] |
| property | ContinuousMove/Stop | zoom | [−1, 1] |

The method is not limited to the exact blocks shown above. For example, the actions taken at block 602 and 604 may not be performed if the control server and translation server are combined in a single unit. Similarly, other combinations may be made if the control server and translation server are combined into a single device. The techniques described herein provide a mechanism to access existing devices, such as ONVIF products, from OIC standard devices without changing either standard, and without modifying or updating existing external device software stack or firmware.

Figure 7:
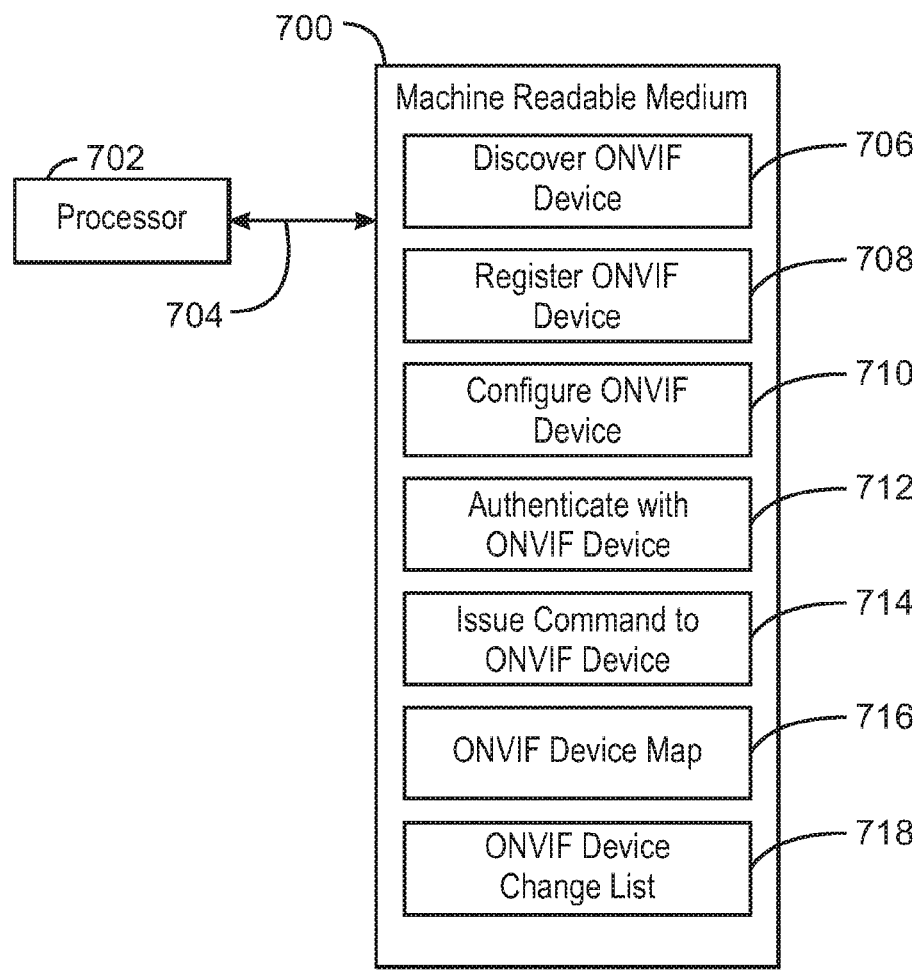
FIG. 7 is a block diagram of an example non-transitory machine readable medium including instructions to direct a processor to implement the functions of an ONVIF thrift server.

FIG. 7 is a block diagram of an example non-transitory machine readable medium 700 including instructions to direct a processor 702 to implement the functions of an ONVIF thrift server. The non-transitory, machine readable medium 700 may be accessed by the processor 702 over a bus 704 that may include a proprietary bus in an SoC, a SRI bus, or any numbers of other bus technologies, as described with respect to FIG. 4. The non-transitory, machine readable medium 700 may include, for example, any type of read only memory (ROM), any type of solid state drive (SSD), any type of random access memory (RAM), and the like.

The non-transitory, machine readable medium 700 may include instructions 706 to direct the processor 702 to discover ONVIF devices, as described herein. Instructions 708 may be included to direct the processor 702 to register ONVIF devices, either automatically, or through a manual registration process. Further instructions 710 may be included to direct the processor 702 to configure the ONVIF device. Instructions 712 may be included to direct the processor 702 to authenticate with the ONVIF device. Instructions 714 may be included to issue a command to an ONVIF device.

The non-transitory, machine readable medium 700 may also include an ONVIF device map, for example, maintained by the instructions 706 that discover the ONVIF device. The ONVIF device map 716 may be used to generate an ONVIF device change list 718, indicating changes that have occurred since a previous device query.

Figure 8:
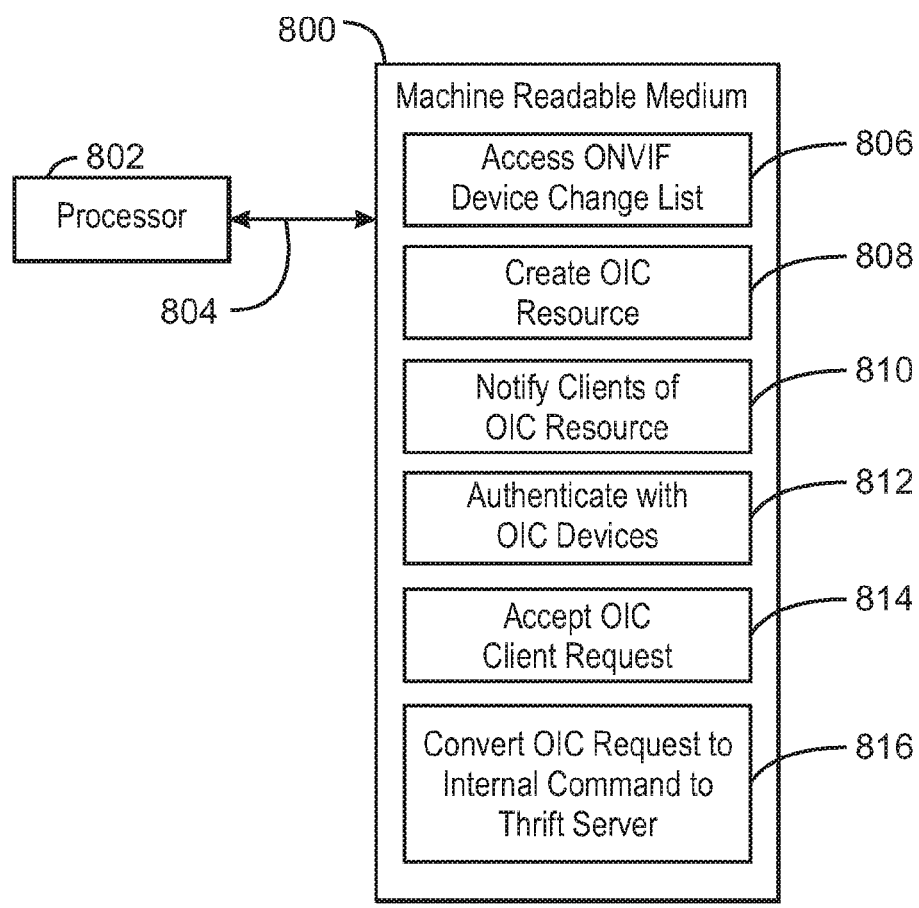
FIG. 8 is a block diagram of an example non-transitory machine readable medium 800 including instructions to direct a processor 802 to implement the functions of an ONVIF/OIC server.

FIG. 8 is a block diagram of an example non-transitory machine readable medium 800 including instructions to direct a processor 802 to implement the functions of an ONVIF/OIC server. The non-transitory, machine readable medium 800 may be accessed by the processor 802 over a bus 804 that may include a proprietary bus in an SoC, a SRI bus, or any numbers of other bus technologies, as described with respect to FIG. 4. The non-transitory, machine readable medium 800 may include, for example, any type of read only memory (ROM), any type of solid state drive (SSD), any type of random access memory (RAM), and the like.

The non-transitory, machine readable medium 800 may include instructions 806 to direct the processor 802 to access an ONVIF device list or change list in an ONVIF thrift server, as described herein. Instructions 808 may be included to direct the processor 802 to create OIC resources for ONVIF devices found. Further instructions 810 may be included to direct the processor 802 to notify clients of the OIC resources. Instructions 812 may be included to direct the processor 802 to authenticate with the OIC devices. Instructions 814 may be included to accept an OIC client request, for example, to change a control value in an OIC resource for an ONVIF device. Instructions 816 may be included to convert the OIC request to an internal command and pass the command to a thrift server.

EXAMPLES

Example 1 includes an apparatus including an open network video interface forum (ONVIF) thrift server. The ONVIF thrift server includes an ONVIF communications subsystem, a network communication subsystem, an ONVIF registrar to discover an ONVIF device through the ONVIF communications subsystem, and a thrift server application programming interface (API) to communicate with an ONVIF/OIC (open interconnect consortium) server through the network communication subsystem.

Example 2 includes the subject matter of example 1. In this example, the ONVIF communications subsystem, the network communications subsystem, or both includes a wireless local area network.

Example 3 includes the subject matter of either of examples 1 or 2. In this example, the ONVIF device includes a camera.

Example 4 includes the subject matter of any of examples 1 to 3. In this example, the ONVIF communications subsystem, the network communications subsystem, or both includes a Bluetooth connection.

Example 5 includes the subject matter of any of examples 1 to 4. In this example, the ONVIF thrift server includes an ONVIF controller to send commands to the ONVIF device.

Example 6 includes the subject matter of any of examples 1 to 5. In this example, the ONVIF thrift server includes an ONVIF configurator to configure the ONVIF device.

Example 7 includes the subject matter of any of examples 1 to 6. In this example, the ONVIF thrift server includes an ONVIF authenticator to authenticate with the ONVIF device.

Example 8 includes the subject matter of any of examples 1 to 7. In this example, the ONVIF thrift server includes an OIC API to communicate with other OIC devices.

Example 9 includes the subject matter of any of examples 1 to 8. In this example, the ONVIF/OIC server includes an ONVIF device retriever to access an ONVIF device map in the ONVIF thrift server, wherein the ONVIF device retriever maintains an ONVIF device list in the ONVIF/OIC server. The ONVIF/OIC server also includes an OIC configurator to create an OIC resource for the ONVIF device, and the thrift API to convert an OIC command received in the ONVIF/OIC server to an internal format and communicate the converted OIC command to the ONVIF thrift server.

Example 10 includes the subject matter of example 9. In this example, the ONVIF/OIC server includes an OIC authenticator to authenticate to other OIC devices, and an OIC API to communicate with the other OIC devices.

Example 11 includes the subject matter of any of examples 1 to 10. In this example, the apparatus includes a virtual device including an OIC device, the ONVIF/OIC server, the ONVIF thrift server, and the ONVIF device.

Example 12 includes the subject matter of any of examples 1 to 10. In this example, the apparatus includes a plurality of OIC devices, the ONVIF/OIC server, the ONVIF thrift server, and a plurality of ONVIF devices.

Example 13 includes a method for communicating between an external device and an open interconnect consortium (OIC) compatible device. The method includes discovering an external device by a control server, determining a change in a device map in the control server, and communicating the change in the device map to a translation server.

Example 14 includes the subject matter of example 13. In this example, the method includes opening a connection between the control server and the translation server.

Example 15 includes the subject matter of either of examples 13 or 14. In this example, the method includes querying the control server by the translation server about external devices.

Example 16 includes the subject matter of any of examples 13 to 15. In this example, the method includes creating OIC resources for the external device in the translation server.

Example 17 includes the subject matter of any of examples 13 to 16. In this example, the method includes allowing another OIC device to discover the OIC resources for the external device in the translation server.

Example 18 includes the subject matter of any of examples 13 to 17. In this example, the method includes providing another OIC device with the OIC resources for the external device.

Example 19 includes the subject matter of any of examples 13 to 18. In this example, the method includes deleting the OIC resources if the control server cannot access the external device.

Example 20 includes the subject matter of any of examples 13 to 19. In this example, the method includes configuring the external device from the control server.

Example 21 includes the subject matter of any of examples 13 to 20. In this example, the method includes receiving a command from an OIC device in the ONVIF/OIC server, converting the command to an internal format, sending the command to the ONVIF thrift server, converting the command to an ONVIF device command, and sending the ONVIF device command from the ONVIF thrift server to the ONVIF device.

Example 22 includes a non-transitory, machine readable medium including instructions to direct a processor in an ONVIF (open network video interface forum) thrift server to discover an ONVIF device, register the ONVIF device to prepare an ONVIF device map, and configure the ONVIF device.

Example 23 includes the subject matter of example 22. In this example, the non-transitory, machine readable medium includes instructions to direct the processor in the ONVIF thrift server to authenticate the ONVIF thrift server with the ONVIF device.

Example 24 includes the subject matter of either of examples 22 or 23. In this example, the non-transitory, machine readable medium includes instructions to direct a processor in the ONVIF thrift server to receive a command from an ONVIF/OIC (open interconnect consortium) server, and control the ONVIF device.

Example 25 includes a non-transitory, machine readable medium including instructions to direct a processor in an ONVIF (open network video interface forum)/OIC (open interconnect consortium) server to access a device change list in an ONVIF thrift server, create a new OIC resource for any new ONVIF devices in the device change list, and delete a current OIC resource for any ONVIF devices indicated as deleted in the device change list.

Example 26 includes the subject matter example 25. In this example, the non-transitory, machine readable medium includes instructions to direct the processor in the ONVIF/OIC server to notify clients of OIC resource changes.

Example 27 includes the subject matter of either of examples 25 or 26. In this example, the non-transitory, machine readable medium includes instructions to direct the processor in the ONVIF/OIC server to authenticate to an OIC device.

Example 28 includes the subject matter of any of examples 25 to 27. In this example, the non-transitory, machine readable medium includes instructions to direct the processor in the ONVIF/OIC server to accept a client request from an OIC device, convert the client request to an internal command format, and send the command to the ONVIF thrift server.

Example 29 includes an open network video interface forum (ONVIF) thrift server including an ONVIF communications subsystem, a network communication subsystem, an ONVIF registrar to discover an ONVIF device through the ONVIF communications subsystem, and a thrift server application programming interface (API) to communicate with an ONVIF/OIC (open interconnect consortium) server through the network communication subsystem.

Example 30 includes the subject matter of example 29. In this example, the ONVIF communications subsystem, the network communications subsystem, or both includes a wireless local area network.

Example 31 includes the subject matter of either of examples 29 or 30. In this example, the ONVIF device includes a camera.

Example 32 includes the subject matter of any of examples 29 to 31. In this example, the ONVIF communications subsystem, the network communications subsystem, or both includes a Bluetooth connection.

Example 33 includes the subject matter of any of examples 29 to 32. In this example, the ONVIF thrift server includes an ONVIF controller to send commands to the ONVIF device.

Example 34 includes the subject matter of any of examples 29 to 33. In this example, the ONVIF thrift server includes an ONVIF configurator to configure the ONVIF device.

Example 35 includes the subject matter of any of examples 29 to 34. In this example, the apparatus includes an ONVIF authenticator to authenticate with the ONVIF device.

Example 36 includes the subject matter of any of examples 29 to 36. In this example, the apparatus includes an OIC API to communicate with other OIC devices.

Example 37 includes an open network video interface forum (ONVIF)/open interconnect consortium (OIC) server. The ONVIF/OIC server includes an ONVIF device retriever to access an ONVIF device map in an ONVIF thrift server, wherein the ONVIF device retriever maintains an ONVIF device list in the ONVIF/OIC server. The ONVIF/OIC server also includes an OIC configurator to create an OIC resource for an ONVIF device, and a thrift API to convert an OIC command received in the ONVIF/OIC server to an internal format and communicate the converted OIC command to the ONVIF thrift server.

Example 38 includes the subject matter of example 37. In this example, the ONVIF/OIC server includes an OIC authenticator to authenticate to other OIC devices, and an OIC API to communicate with the other OIC devices.

Example 39 includes the subject matter of either of examples 37 or 38. In this example, the ONVIF/OIC server includes a virtual device including an OIC device, the ONVIF/OIC server, the ONVIF thrift server, and the ONVIF device.

Example 40 includes the subject matter of any of examples 37 to 39. In this example, the ONVIF/OIC server includes a virtual device including a plurality of OIC devices, the ONVIF/OIC server, the ONVIF thrift server, and a plurality of ONVIF devices.

Example 41 includes an apparatus including an open network video interface forum (ONVIF) thrift server, including an ONVIF communications subsystem an ONVIF registrar to discover an ONVIF device through the ONVIF communications subsystem, and a means to communicate with an ONVIF/OIC (open interconnect consortium) server.

Example 42 includes the subject matter of example 41. In this example, the apparatus includes a means for establishing a wireless network.

Example 43 includes the subject matter of either of examples 41 or 42. In this example, the ONVIF device includes a means for collecting an image.

Example 44 includes the subject matter of any of examples 41 to 43. In this example, the ONVIF thrift server includes a means for sending commands to the ONVIF device.

Example 45 includes the subject matter of any of examples 41 to 44. In this example, the ONVIF thrift server includes a means for configuring the ONVIF device.

Example 46 includes the subject matter of any of examples 41 to 45. In this example, the ONVIF thrift server includes a means for authenticating with the ONVIF device.

Example 47 includes the subject matter of any of examples 41 to 46. In this example, the ONVIF thrift server includes a means for communicating with other OIC devices.

Example 48 includes the subject matter of any of examples 41 to 47. In this example, the ONVIF/OIC server includes an ONVIF device retriever to access an ONVIF device map in the ONVIF thrift server, wherein the ONVIF device retriever maintains an ONVIF device list in the ONVIF/OIC server. The ONVIF/OIC server also includes a means for creating an OIC resource for the ONVIF device.

Example 49 includes the subject matter of any of examples 41 to 48. In this example, the ONVIF/OIC server includes a means for authenticating to other OIC devices.

Example 50 includes the subject matter of any of examples 41 to 49. In this example, the ONVIF/OIC server includes a means for communicating with other OIC devices.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An apparatus, comprising an open network video interface forum (ONVIF) thrift server, comprising:
   an ONVIF communications subsystem;
   a network communication subsystem;
   an ONVIF registrar to discover an ONVIF device through the ONVIF communications subsystem; and
   a thrift server application programming interface (API) to communicate with an ONVIF-OIC (open interconnect consortium) server through the network communication subsystem to allow an ONVIF device to communicate with and participate in networks of OIC devices without modification of an ONVIF standard.

2. The apparatus of claim 1, wherein the ONVIF communications subsystem, the network communications subsystem, or both comprises a wireless local area network.

3. The apparatus of claim 1, wherein the ONVIF device comprises a camera.

4. The apparatus of claim 1, wherein the ONVIF communications subsystem, the network communications subsystem, or both comprises a Bluetooth connection.

5. The apparatus of claim 1, wherein the ONVIF thrift server comprises an ONVIF controller to send commands to the ONVIF device.

6. The apparatus of claim 1, wherein the ONVIF thrift server comprises an ONVIF configurator to configure the ONVIF device.

7. The apparatus of claim 1, wherein the ONVIF thrift server comprises an ONVIF authenticator to authenticate with the ONVIF device.

8. The apparatus of claim 1, wherein the ONVIF thrift server comprises an OIC API to communicate with other OIC devices.

9. An apparatus, comprising an open network video interface forum (ONVIF) thrift server, comprising:
   an ONVIF communications subsystem;
   a network communication subsystem;
   an ONVIF registrar to discover an ONVIF device through the ONVIF communications subsystem; and
   a thrift server application programming interface (API) to communicate with an ONVIF-OIC (open interconnect consortium) server through the network communication subsystem;
   wherein the ONVIF/OIC server comprises:
      an ONVIF device retriever to access an ONVIF device map in the ONVIF thrift server, wherein the ONVIF device retriever maintains an ONVIF device list in the ONVIF/OIC server;
      an OIC configurator to create an OIC resource for the ONVIF device; and
      the thrift API to convert an OIC command received in the ONVIF/OIC server to an internal format and communicate the converted OIC command to the ONVIF thrift server.

10. The apparatus of claim 9, wherein the ONVIF/OIC server comprises:
    an OIC authenticator to authenticate to other OIC devices; and
    an OIC API to communicate with the other OIC devices.

11. The apparatus of claim 1, comprising a virtual device comprising:
    an OIC device;
    the ONVIF/OIC server;
    the ONVIF thrift server; and
    the ONVIF device.

12. The apparatus of claim 1, comprising a virtual device comprising:
    a plurality of OIC devices;
    the ONVIF/OIC server;
    the ONVIF thrift server; and
    a plurality of ONVIF devices.

13. A method for communicating between an external device and an open interconnect consortium (OIC) compatible device, comprising:
    discovering an external device by a control server;
    determining a change in a device map in the control server;
    communicating the change in the device map to a translation server; and
    allowing an external device to communicate with and participate in networks of OIC devices without modification of a standard of the external device.

14. The method of claim 13, comprising opening a connection between the control server and the translation server.

15. The method of claim 13, comprising querying the control server by the translation server about external devices.

16. The method of claim 13, comprising creating OIC resources for the external device in the translation server.

17. The method of claim 16, comprising allowing another OIC device to discover the OIC resources for the external device in the translation server.

18. The method of claim 17, comprising providing another OIC device with the OIC resources for the external device.

19. The method of claim 13, comprising configuring the external device from the control server.

20. A method for communicating between an external device and an open interconnect consortium (OIC) compatible device, comprising:
    discovering an external device by a control server;
    determining a change in a device map in the control server;
    communicating the change in the device map to a translation server;
    receiving a command from an OIC device in the translation server;
    converting the command to an internal format;
    sending the command to the control server;
    converting the command to an external device command; and
    sending the external device command from the control server to the external device.

21. A non-transitory, machine readable medium comprising instructions to direct a processor in an ONVIF (open network video interface forum) thrift server to:
    discover an ONVIF device;
    register the ONVIF device to prepare an ONVIF device map; and
    configure the ONVIF device; and
    allow an ONVIF device to communicate with and participate in networks of OIC devices without modification of an ONVIF standard.

22. The non-transitory, machine readable medium of claim 21, comprising instructions to direct the processor in the ONVIF thrift server to authenticate the ONVIF thrift server with the ONVIF device.

23. The non-transitory, machine readable medium of claim 21, comprising instructions to direct a processor in the ONVIF thrift server to:
- receive a command from an ONVIF/OIC (open interconnect consortium) server; and
- control the ONVIF device.

24. A non-transitory, machine readable medium comprising instructions to direct a processor in an ONVIF/OIC (open interconnect consortium) server to:
- access a device change list in an ONVIF thrift server;
- create a new OIC resource for any new ONVIF devices in the device change list;
- delete a current OIC resource for any ONVIF devices indicated as deleted in the device change list; and
- allow an ONVIF device to communicate with and participate in networks of OIC devices without modification of an ONVIF standard.

25. The non-transitory, machine readable medium of claim 24 comprising instructions to direct the processor in the ONVIF/OIC server to notify clients of OIC resource changes.

* * * * *